United States Patent
D'Ercoli et al.

(10) Patent No.: US 11,853,394 B2
(45) Date of Patent: Dec. 26, 2023

(54) IMAGE MULTIPROCESSING METHOD FOR VISION SYSTEMS

(71) Applicant: Datalogic IP Tech S.R.L., Lippo di Calderara di Reno (IT)

(72) Inventors: Francesco D'Ercoli, Bologna (IT); Francesco Paolo Muscaridola, Bologna (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 307 days.

(21) Appl. No.: 17/295,771

(22) PCT Filed: Nov. 21, 2018

(86) PCT No.: PCT/IT2018/000150
§ 371 (c)(1),
(2) Date: May 20, 2021

(87) PCT Pub. No.: WO2020/105069
PCT Pub. Date: May 28, 2020

(65) Prior Publication Data
US 2022/0027676 A1    Jan. 27, 2022

(51) Int. Cl.
*G06F 18/21* (2023.01)
*G06V 10/94* (2022.01)
(Continued)

(52) U.S. Cl.
CPC ........ *G06F 18/2163* (2023.01); *G06F 18/214* (2023.01); *G06F 18/23* (2023.01); *G06F 18/24* (2023.01); *G06V 10/955* (2022.01)

(58) Field of Classification Search
CPC .... G06F 18/2163; G06F 18/24; G06F 18/214; G06F 18/23; G06V 10/955
See application file for complete search history.

(56) References Cited

U.S. PATENT DOCUMENTS

| 7,075,541 B2 | 7/2006 | Diard |
| 7,525,547 B1 | 4/2009 | Diard |

(Continued)

OTHER PUBLICATIONS

Arndt et al.; "Parallel implementation of real-time semi-global matching on embedded multi-core architectures", International Conference on Embedded Computer Systems: Architectures, Modeling, and Simulation (SAMOS), IEEE, Jul. 15, 2013, pp. 56-63, 8 pages.

(Continued)

*Primary Examiner* — David Perlman
(74) *Attorney, Agent, or Firm* — Foley & Lardner LLP

(57) ABSTRACT

The present disclosure relates to a method for image classes definition and to a method for image multiprocessing and related vision system, which implement said method for image classes definition. The latter comprising an image splitting operation for each image of M input images, the image splitting operation comprising the steps of: a) splitting the image into image portions; b) executing the algorithm onto each image portion with at least one processing unit; c) identifying the image portion associated with a maximum execution time of said algorithm; d) splitting said identified image portion into further image portions; e) checking if a stop criterion is met: e1) if the stop criterion is met, iterating steps a) to e) onto another one of the M input images; e2) if the stop criterion is not met, executing a predefined image processing algorithm onto each of the further image portions; identifying the image portion or further image portion associated with a maximum execution time of said algorithm; and iterating steps d) to e) on the so identified image portions portion or further image portion; wherein after executing steps a) to e) on all of the M input images, the method for image classes definition further comprises the steps of: f) identifying in an image space, for all the M input images, the positions of each split image portion/further image portion and defining clusters (A, B, C) based thereon;

(Continued)

g) defining a set of Q image classes (A', B', C, AC) based on said clusters (A, B, C), each class (A', B', C, AC) being univocally associated with a splitting pattern representing in the image space a plurality of regions to be allocated to a corresponding plurality of processing units of the vision system for image multiprocessing.

20 Claims, 5 Drawing Sheets

(51) Int. Cl.
    *G06F 18/23*     (2023.01)
    *G06F 18/24*     (2023.01)
    *G06F 18/214*     (2023.01)

(56) References Cited

U.S. PATENT DOCUMENTS

| | | | |
|---|---|---|---|
| 8,056,086 B2 * | 11/2011 | El-Mahdy | G06F 9/5066 |
| | | | 718/105 |
| 8,705,879 B2 | 4/2014 | Abdo et al. | |
| 2010/0202681 A1 * | 8/2010 | Ai | G06V 40/165 |
| | | | 382/159 |
| 2016/0148376 A1 | 5/2016 | Ryu et al. | |
| 2016/0171331 A1 | 6/2016 | Csefalvay | |
| 2016/0345008 A1 * | 11/2016 | Nakaishi | H04N 19/119 |
| 2017/0006215 A1 * | 1/2017 | Leung | G08B 13/19606 |

OTHER PUBLICATIONS

International Search Report and Written Opinion corresponding to PCT/IT2018/000150, dated Jun. 17, 2019, 15 pages.

Intel White Paper, Optimizing Software for Multi-core Processors, Intel Corporation, 2007, 1-16, 16 pps.

Kika et al., Multithreading Image Processing in Single-core and Multi-core CPU using Java, International Journal of Advanced Computer Science and Applications, vol. 4, No. 9, 2013, 165-169, 5 pps.

Kumar, Mukesh, Texas Instruments White Paper, Leveraging Multicore Processors for Machine Vision Applications, Texas Instruments Incorporated, May 2012, 9 pps.

Martinez et al., Dynamic Multicore Resource Management: A Machine Learning Approach, IEEE Computer Society, 2009, 8-17, 10 pps.

Molero, et al., Efficient Implementation of Hyperspectral Anomaly Detection Techniques on GPUs and Multicore Processors, IEEE Journal of Selected Topics in Applied Earth Observations and Remote Sensing, vol. 7, No. 6, Jun. 2014, 2256-2266, 11 pps.

Patil, Trupti, Evaluation of Multi-Core Architectures for Image Processing Algorithms, Aug. 2009, 69 pps.

Samet et al., Real-Time Image Processing Applications on Multicore CPUs and GPGPU, Proceedings of the International Conference on Parallel and Distributed Processing Techniques and Applications, 2015, 116-122, 7 pps.

* cited by examiner

IMAGE MULTIPROCESSING METHOD FOR VISION SYSTEMS

CROSS REFERENCE TO RELATED APPLICATIONS

This application is a 371 National Stage Application of International Application No. PCT/IT2018/000150, filed Nov. 21, 2018, which is incorporated herein by reference in its entirety.

BACKGROUND

In recent years, vision systems, in particular embedded vision systems, have become increasingly complex and require high computational power to perform their functions.

Image processing—such as, for example, coded information localization and/or decoding, OCR, feature extraction, morphological filtering, microscope imaging, remote sensing and similar—plays an essential role in most applications of embedded vision systems.

New generation embedded digital architectures may involve processors (e.g. systems-on-chip (SoC), on board Field Programmable Gate Array (FPGA) or Graphics Processing Unit (GPU)) having multiple processing units. Multiprocessing (i.e. parallel processing with multiple processing units) is becoming a significant tool for implementing high speed computing. The trend in the development of multiprocessing is towards an ever-increasing number of processing units, so that processors with hundreds or even thousands of parallel processing units will be available.

A multiprocessing system can be implemented in a physical system including a shared memory physical multiprocessor, for example a Chip Multi-Processor (CMP), containing multiple processing units (for example, called cores) on a same chip. Such multiprocessor can be part, for example, of a Central Processing Unit (CPU), or of a Graphics Processing Unit (GPU).

A similar effect may be obtained by exploiting the ability of a physical processor, such as a CPU or a GPU, or of each single core in a multi-core processor, to execute multiple processes or threads concurrently, supported by the operating system. This approach is known as "multithreading" and it differs from "physical" multiprocessing systems in that the latter includes multiple complete processing units in one or more cores, whereas multithreading systems aim at increasing utilization of a single core by using thread-level parallelism. However, these two techniques are complementary and often combined in embedded systems.

Alternatively or in addition, multiprocessing implementations may involve solely logic synthesis, in particular through the use of different semiconductor devices containing programmable logic (e.g., ASIC, FPGA, CPLD).

In view of the above, in the present disclosure and claims, the term "processing unit" is meant to indicate a physical portion of a processor (like a core of a multi-core processor) or a process of a multi-process processor (like a thread of a multithreading processor) or a software core in a processor (like in an ASIC, FPGA or CPLD processor).

Within the specific context of vision systems, a multiprocessing approach, in any of the above possible implementations, can be adopted to reduce the overall execution time of the image analysis algorithms involved, which may be computationally intensive depending on the type of images to be processed and on the type of elaboration required, which in turn depends on the specific application of the vision system.

U.S. Pat. No. 8,705,879 B2 discloses a method for compressing images on a system having a plurality of processors, such method comprising dividing the image into a plurality of slices, associating a thread per processor, assigning each slice to an associated thread for performing compression and, once each slice has been compressed, the slices are assembled into a second image corresponding to the original image being compressed.

The Applicant notes that this document is concerned with the use of compression algorithms so as to reduce the bandwidth needed for transmission of images over communications networks. Considering that such compression algorithms require a non-negligible processing time, the document discloses image splitting so as to carry out in parallel the compression of each slice on a dedicated thread. The document discloses a simple partition of each image into a plurality of slices, such as rectangular strips that are of the same horizontal dimension as the image.

The Applicant observes that a simple partition into slices as the one suggested by the above document does not lead to an optimal allocation of the processing resources, as equally partitioned image portions might have very different features (reflecting different data contents) which might in turn require very different processing times.

SUMMARY

It is an object of the present disclosure to provide a technique aimed at automatically optimizing the allocation of multiple processing resources for image multiprocessing in vision systems.

In a first aspect, the present disclosure thus relates to a method for image classes definition for image multiprocessing according to a predefined image processing algorithm of a vision system, said method comprising an image splitting operation for each image of M input images, with M integer higher than 1, the image splitting operation comprising the steps of:
  a) splitting the image into image portions;
  b) executing the predefined image processing algorithm onto each image portion with at least one processing unit;
  c) measuring an execution time of said predefined image processing algorithm onto each of the image portions and identifying the image portion among the image portions which is associated with a maximum execution time of said predefined image processing algorithm;
  d) splitting said identified image portion into further image portions;
  e) checking if a stop criterion is met:
    e1) if the stop criterion is met, iterating steps a) to e) onto another one of the M input images till the image splitting operation has been performed onto all the M input images;
    e2) if the stop criterion is not met, executing the predefined image processing algorithm onto each of the further image portions; measuring an execution time of said predefined image processing algorithm on each of the further image portions and identifying, among the image portions and the further image portions, the image portion or further image portion which is associated with a maximum execution time of said predefined image processing algorithm; and iterating steps d) to e) on the so identified image portion or further image portion;

wherein after executing steps a) to e) on all of the M input images, the method further comprises the steps of:

f) identifying in an image space, for all the M input images, the positions of each split image portion and any split further image portion and defining clusters based on said identified positions;

g) defining a set of Q image classes based on said clusters, with Q integer higher than 1, each class being univocally associated with a splitting pattern representing in the image space a plurality of regions to be allocated to a corresponding plurality of processing units of the vision system for image multiprocessing with said predefined image processing algorithm.

In a second aspect, the present disclosure relates to a method for image multiprocessing in a vision system according to a predefined image processing algorithm, comprising the steps of:

receiving an image to be processed;

associating with said image a class among a predefined set of Q classes, with Q integer higher than 1, said class having a splitting pattern univocally associated therewith;

splitting the image according to said splitting pattern;

executing the predefined image processing algorithm separately onto all portions resulting from said splitting by means of a corresponding plurality of processing units of the vision system;

wherein the predefined set of Q classes and the splitting patterns univocally associated therewith are defined through a method of image classes definition executed, according to the first aspect of the present disclosure, with said predefined image processing algorithm.

In a third aspect, the present disclosure relates to a vision system for image multiprocessing according to a predefined image processing algorithm, comprising:

a memory for storing a set of Q classes and corresponding splitting patterns univocally associated with the classes, with Q integer higher than 1, as defined through a method of image classes definition executed, according to the first aspect of the present disclosure, with said predefined image processing algorithm; and processing units adapted to perform a method for image multiprocessing according to the second aspect of the present disclosure.

The method of image classes definition according to the present disclosure advantageously enables to automatically define the classes with the corresponding splitting patterns to be used in image multiprocessing by taking into account the time taken by the predefined image processing algorithm to process split image portions. In particular, the splitting patterns associated with the defined classes are defined in a way that image regions that require higher execution times are split more densely with respect to image regions requiring lower execution times. In this way, in the image multiprocessing, the allocation of multiple processing units of the vision system onto split image portions is automatically performed in an optimized way that enables to minimize the total amount of processing time on the whole image.

The present disclosure, in at least one of the aforementioned aspects, can be implemented according to one or more of the following embodiments, optionally combined together.

Preferably, steps a) to e) are executed in sequence one after the other.

Preferably, in step g) a class is defined for each cluster.

Preferably, in step g) the set of Q image classes is defined taking into account a correlation of the M input images with the defined clusters.

Preferably, in step g) at least one of the classes is defined based on an aggregation of more clusters.

Preferably, said aggregation of clusters is taken into account only if a percentage (for example at least equal to 5 or 10%) of the M input images is correlated with it.

Preferably, in step g), the plurality of regions of said splitting pattern are defined in the image space by splitting the image space more densely in correspondence of the position of the cluster(s) on the basis of which the corresponding class is defined, and by splitting sparsely the rest of the image space.

Preferably, in step f), the positions of each split image portion and any split further image portion are marked in the image space by using suitable markers.

More preferably, in step f), a central position of each split image portion and any split further image portion is marked in the image space by using a suitable marker.

Preferably, said clusters are clusters of said suitable markers identified in said image space.

Preferably, the image space is defined by a plane having same size and same coordinate system of the M input images (all having same size and same coordinate system, as resulting from an image sensor used to acquire the M input images). The coordinate system is preferably a bi-dimensional Cartesian coordinate system.

Preferably, in step e1), if the stop criterion is met, the positions in the image space of each split image portion and of any split further image portion are saved for the current image.

Suitably, in steps b) and e2) the algorithm is separately executed onto each image portion or further image portion.

The predefined image processing algorithm may be executed in steps b) and e2) by means of one or more processing units.

Preferably, in steps b) and e2) the predefined image processing algorithm is executed in parallel onto all of the image portions or further image portions with a corresponding number of processing units. Preferably, said corresponding number of processing units are all symmetric with each other. Preferably, said corresponding number of processing units are all symmetric with a corresponding plurality of processing units of the vision system.

In an alternative embodiment, in steps b) and e2) the predefined image processing algorithm is executed in series onto all of the image portions or further image portions with only one (or a lower number of) processing unit(s). Preferably, said only one (or lower number of) processing unit(s) is symmetric with each of a plurality of symmetric processing units of the vision system.

In an embodiment, the stop criterion checks whether a maximum number Rmax of iterations of step d) is reached. In this embodiment, in step e1) the stop criterion is met when the maximum number of iterations Rmax is reached (number of iterations of step d) ≥Rmax). On the other hand, in step e2) the stop criterion is not met when the maximum number of iterations Rmax is not reached (number of iterations of step d)<Rmax).

Alternatively or in addition, the stop criterion checks whether the last measured maximum execution time is lower than a predefined threshold value. In this embodiment, in step e1) the stop criterion is met when the last measured maximum execution time is lower than the predefined threshold value. On the other hand, in step e2) the stop criterion is not met when the last measured maximum execution time is equal to or higher than the predefined threshold value.

The splitting of step a) is performed so that the image portions are equal or different to each other, preferably equal.

The splitting of step d) is performed so that the further image portions are equal or different to each other, preferably equal.

Preferably, the image portions obtained in step a) have a same aspect ratio of the starting image.

Preferably, the further image portions obtained in step d) have a same aspect ratio of the starting image.

Preferably, at each iteration of step d), a same number N of further image portions is obtained, with N integer higher than 1.

According to an alternative, at each iteration of step d), a different number of further image portions is obtained.

Preferably, the image portions obtained in step a) are in a same number N as the further image portions obtained in step d), with N integer higher than 1.

According to an alternative, the image portions obtained in step a) are in a different number than the further image portions obtained in step d).

Preferably, the image portions are in a number which is a power of two greater than or equal to $2^1$.

Preferably, the further image portions are in a number which is a power of two greater than or equal to $2^1$.

More preferably, the image portions are in a number which is equal to 4.

Preferably, the further image portions are in a number which is equal to 4.

Preferably, when said number is equal to 4, the marker is a point positioned at the crossing point of a horizontal line and a vertical line dividing the image or image portion or further image portion in 4 equal portions (e.g. rectangles or squares).

Preferably, said method is performed at least in part offline.

Preferably, said method is performed on a server external to the vision system.

Preferably, the M input images are digital images.

Preferably, said M input images are training images.

Preferably, the number M of input images is at least equal to 100.

Preferably, the number M of input images can reach up to hundreds of millions.

Preferably, the number Q of classes is at least equal to 2.

Preferably, the number Q of classes is not higher than 20.

More preferably, the number Q of classes is not higher than 15.

Preferably, the processing units in the vision system are in a number P at least equal to 4.

Preferably, the processing units in the vision system are in a number P that can reach up to tens or hundreds of thousands.

The processing units used in steps b) and e2) and/or the processing units of the vision system may be cores and/or threads of a processor like, for example, a CPU ora GPU.

In an embodiment, the predefined image processing algorithm comprises a stack of algorithms to be executed in series one after the other.

Preferably, the predefined image processing algorithm comprises a coded information processing algorithm such as, for example, coded information localization and/or decoding and/or OCR and/or image feature extraction and/or morphological filtering algorithm and/or any image segmentation algorithm.

Preferably, in the method for image multiprocessing, the predefined image processing algorithm is executed in parallel onto all portions resulting from said splitting.

The method of image classes definition may be performed wholly offline with training images; or partially offline with training images and partially online (that is, during execution of the method for image multiprocessing) with the same images to be processed by the vision system; or wholly online with the same images to be processed by the vision system.

Suitably, the training images are exemplary images, which are indicative of the actual images to be processed by the vision system. The training images are distinct from the actual images to be processed by the vision system.

In the offline case, the method of image classes definition is preferably performed before the method for image multiprocessing.

In the offline case, the method of image classes definition is preferably performed on a device external to the vision system.

In the online case, the set of Q classes is preferably continuously (or periodically or event based) upgraded during execution of the method for image multiprocessing by the vision system.

In the online case, the method of image classes definition may be performed by the vision system itself or by a device external to the vision system.

The image multiprocessing may be performed to execute onto the same image a stack of image processing algorithms, in series one after the other.

In this case, for each specific image processing algorithm of said stack of image processing algorithms, the steps of associating a predefined class with the image, splitting the image and executing the predefined image processing algorithm separately onto all portions resulting from the splitting are performed each time based on a set of Q classes and splitting patterns defined through a method of image classes definition executed, according to the first aspect of the present disclosure, with the specific image processing algorithm.

Preferably, the predefined image processing algorithm is stored in the memory of the vision system.

Preferably, the vision system is an embedded vision system.

The vision system preferably comprises a device adapted to capture images with an image sensor, storing the captured images and processing them.

Preferably, the vision system is an embedded vision system adapted to locally process the captured images.

The vision system preferably comprises an imager module (also called "imager engine" or "scan engine").

The imager module preferably comprises a digital camera based, for example, on CCD or CMOS sensors.

The digital camera preferably is a bi-dimensional camera. The bi-dimensional camera preferably has 2D sensor arrays, having pixels arranged in rows and columns.

The image space is suitably defined by the 2D sensor arrays of the digital camera.

The device may also comprise illuminators (e.g. infrared illuminators and/or visible-light illuminators) and/or a user interface and/or optics (e.g. optical lenses and/or mirrors).

The device may be a portable device or a fixed position device (intended to fixedly rest in a predetermined position).

The vision system may be any imager type device, for example a coded information reader.

In the present description and claims, the expression "coded information" is used to indicate information contained in a code, preferably an optical code. The term "code" is used to indicate any graphical representation having the function of storing said coded information. The expression "optical code" comprises graphical representations, which are detectable in the field of visible light and, preferably, also in the range of wavelengths comprised between infrared and ultraviolet.

Particular examples of optical code consist of linear or two-dimensional codes, wherein the information is coded through suitable combinations of elements with a predetermined shape, for example squared, rectangular or hexagonal, of dark color (usually black) separated by clear elements (spaces, usually white), such as barcodes, stacked codes, two-dimensional codes in general, color codes, etc.

The term optical code further comprises, more generally, also other graphical patterns with information coding function, including clear printed characters (letters, numbers, etc.) and special patterns (such as stamps, logos, signatures, fingerprints, etc.).

The coded information may relate, for example, to distance, size, identification data of an object and/or information relating to the object.

BRIEF DESCRIPTION OF THE DRAWINGS

Further characteristics and advantages of the present invention will become clearer from the following detailed description of some preferred embodiments thereof, made as an example and not for limiting purposes with reference to the attached drawings. In such drawings, FIG. 1 schematically illustrates a method for image multiprocessing in a vision system, according to an embodiment of the present disclosure.

DETAILED DESCRIPTION OF THE DRAWINGS

Figure 2:
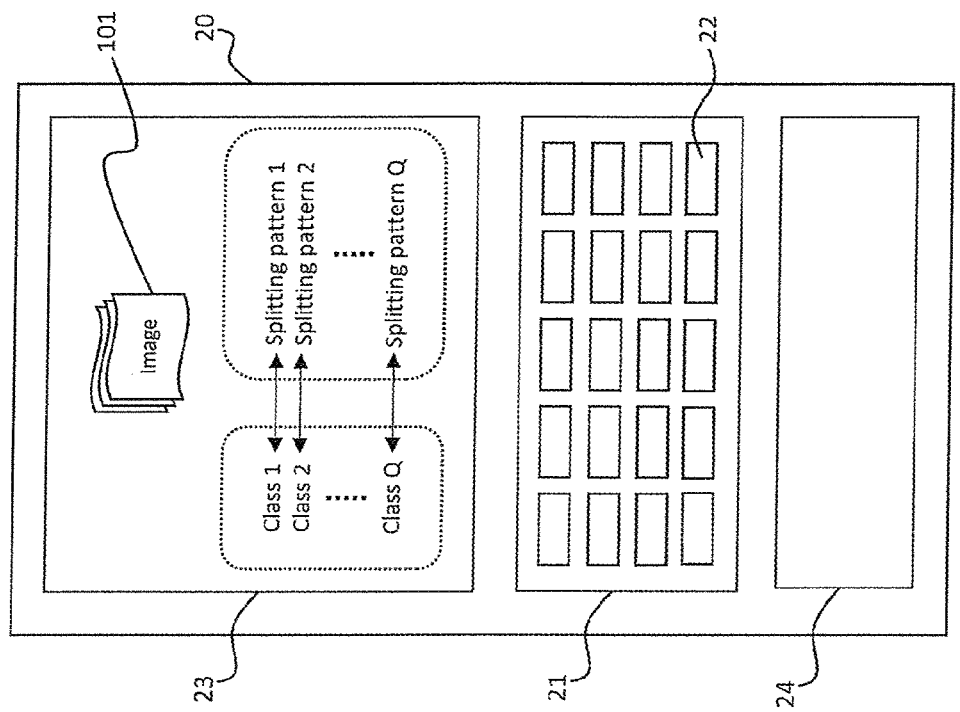
FIG. 2 schematically illustrates a vision system according to an embodiment of the present disclosure.
Figure 1:
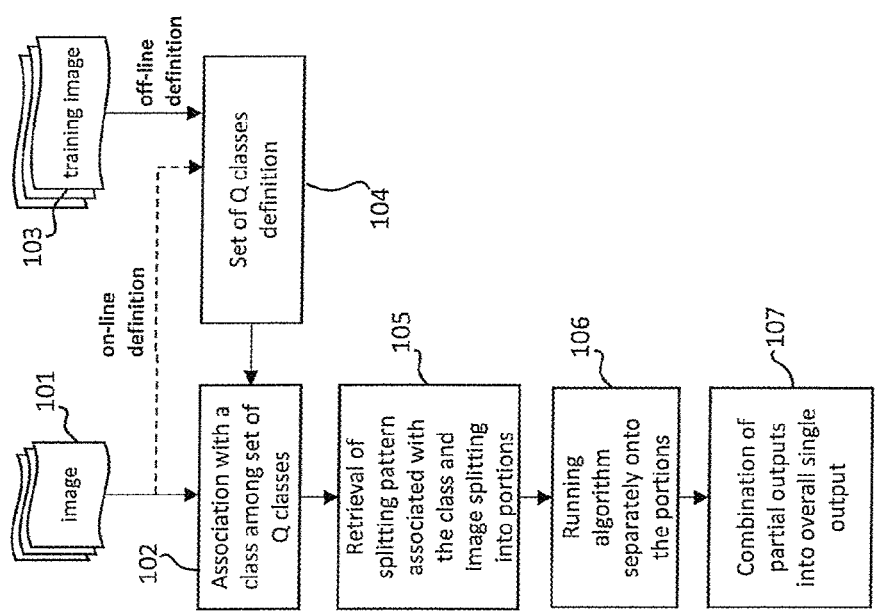

With reference to FIGS. 1 and 2, a method and a vision system 20 for image multiprocessing according to the present disclosure are described. The method is executed on the vision system 20 for processing images for various purposes, based on specific applications.

During normal operation of the vision system 20, digital images 101 are captured by the vision system 20, stored in a memory 23 of the vision system 20 and processed according to at least one predefined image processing algorithm. The image processing algorithm can be any suitable type of algorithm to process images, such as for example an algorithm aimed at barcode localization and/or decoding, OCR, feature extraction, morphological filtering on images, or any image segmentation algorithm known in the art.

Main purpose of the method for image multiprocessing is optimizing the processing resources of the vision system 20, namely reducing the overall execution time of the image processing algorithm for each image to be processed by the vision system 20. This is achieved by splitting each image into multiple portions according to an optimized splitting pattern and by allocating, for processing, each resulting image portion to a separate processing unit 22 of the vision system 20. As explained in detail below, the optimized splitting pattern is determined so as to minimize the total amount of processing time for the whole image. In this way fast real time processing is guaranteed even when large images (e.g. greater than 5 Mpixels) are involved.

As shown in FIG. 1, according to the method of image multiprocessing of the present disclosure, at block 102 a digital image 101 to be processed is associated with a class of a predefined set of Q classes, Q being an integer higher than 1.

As explained in more detail below with reference to FIGS. 3-6, the association at block 102 is preferably made by means of a classifier capable of identifying, for any image 101 to be processed by the vision system 20, a class to be associated with the image, among the predefined set of Q classes.

As explained in more detail below with reference to FIGS. 3-6, the predefined set of classes is defined by means of an image classes definition method (block 104), wherein a set of Q classes is defined and each class is univocally associated with an optimized splitting pattern to be used for splitting images belonging to the class.

As shown in FIG. 1 and explained in more detail below with reference to FIGS. 3-6, the image classes definition at block 104 may be performed either offline with training images 103, or online with the actual images 101 to be processed by the vision system 20.

After the image is associated with a class (block 102), at block 105 an optimized splitting pattern univocally associated with said class is retrieved (e.g. as schematically shown in FIG. 2, from a suitable database stored in memory 23 of the vision system 20 wherein each class is associated with a corresponding splitting pattern) and the image is split into portions according to said splitting pattern.

As explained more in detail below, each splitting pattern represents in an image space a plurality of image regions to be allocated to a corresponding number P of processing units 22 of the vision system 20.

At block 106 the predefined image processing algorithm is thus executed in parallel and separately onto all portions resulting from said splitting by using the corresponding number P of processing units 22 of the vision system 20.

At block 106 the number P of processing units 22 may be assigned to the corresponding P split portions according to any suitable criterion.

At block 107, partial outputs of the predefined image processing algorithm executed onto each processed image portion are combined to obtain an overall single output for the multi-processed image.

As schematically represented in FIG. 2, the vision system 20 preferably is an embedded vision system, as it is equipped with its own processor 21 for image processing, which comprises processing units 22 capable of working in parallel to implement multiprocessing as at block 106 of FIG. 1.

By way of a non-limiting example, twenty processing units 22 are shown in FIG. 2, but according to the present disclosure the processor 21 of the vision system 20 might be equipped with any number of processing units 22 (provided that these are in a number to allow parallel multi-processing).

It should be noted that not all the processing units 22 of the vision system 20 will be exploited for parallel processing at block 106, as some of them will be let available to execute other operations that are required for operating the vision system 20, such as for example steps at blocks 102, 105 and 107 of FIG. 1, and, optionally, for executing the image classes definition method of block 104, or more in general for executing any other task that the vision system 20 might be required to carry out, such as for example data transmission and/or reception in a network, monitoring of on-board sensors and/or actuator, data analytics, etc. By way of example, only sixteen (i.e. P=16) out of twenty processing units 22 might be available for image multi-processing, four of them being intended for carrying out the other operations. Preferably, the P processing units 22 intended for image multi-processing are all symmetric, namely they all have the same computational capacity.

The vision system 20 further comprises memory 23, in particular a non-volatile memory such as a ROM or EEPROM, which stores the predefined set of classes and the univocally associated splitting patterns as determined by the image classes definition method of block 104, the predefined image processing algorithm(s) (not shown in FIG. 2), the images 101 to be processed and any other data required for operation of the vision system 20.

The vision system 20 further comprises an imager module generically indicated with reference number 24, which executes specific functions of the vision system 20. Such imager module 24 may integrate for example a digital camera, such as for example a bi-dimensional camera, based on CCD or CMOS sensors.

Other electronic components of the vision system 20 will not be described herein, as they are within the reach of a person skilled in the art.

With reference to FIGS. 3-6, the image classes definition method, corresponding to block 104 of FIG. 1, is now described in detail.

Figure 3:
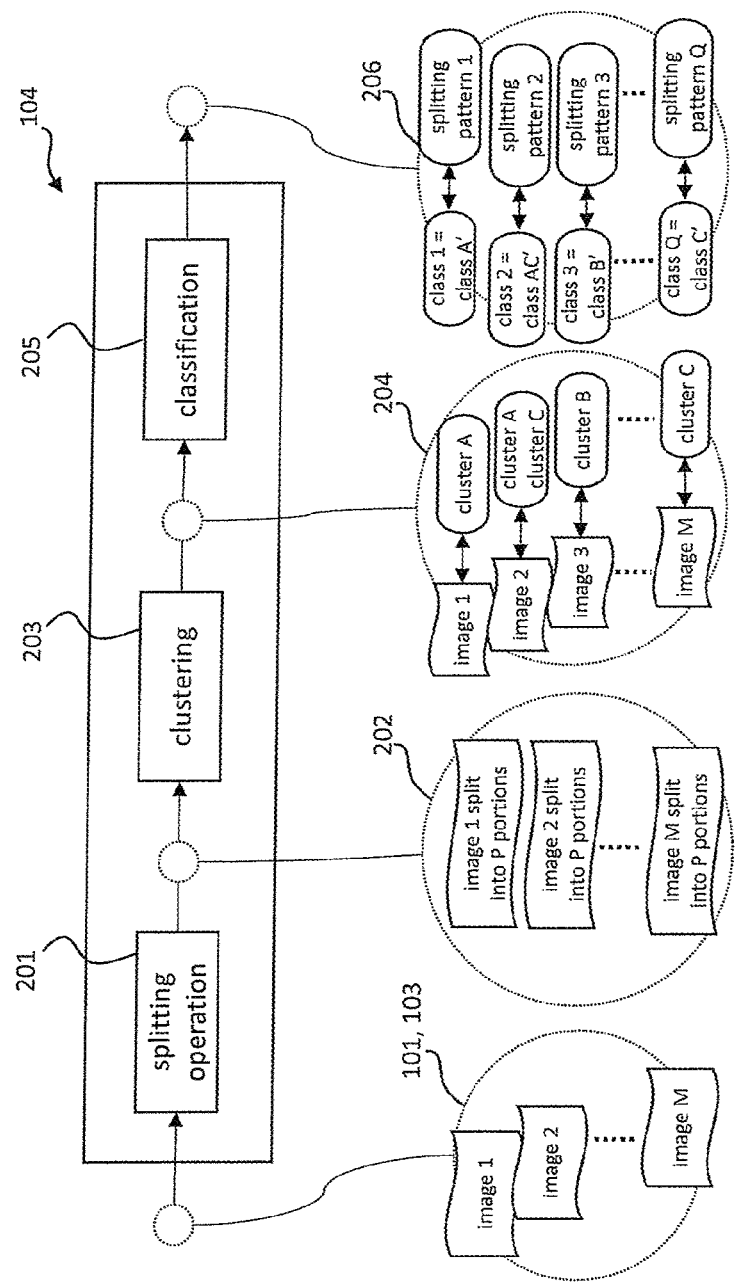
FIG. 3 schematically illustrates a method of image classes definition for image multiprocessing, according to an embodiment of the present disclosure.

As shown in FIG. 3, said image classes definition method comprises an image splitting operation 201, a clustering step 203 and a classification step 205.

The method is performed on M input digital images, with M integer higher than 1. The M input images may be the training images 103 of FIG. 1 or, optionally, the actual images 101 of FIG. 1.

When the M input images are training images 103, the method of image classes definition is preferably carried out offline, namely at the time of designing the vision system 20. In this case, the method might be carried out onto the vision system 20 itself, using the same processing units 22 that are used during regular operation of the vision system 20, or else on a different device or system, such as for example a dedicated external device or an external server to better exploit a potentially higher computational capacity. For example, the external device may be a network connected remote client (e.g. a PC equipped with a GPU and a TensorFlow framework). In the case of a dedicated external device or external server, the external processing units will be symmetric processing units, namely processing units having computational capacity equal to each other and, preferably, to the computational capacity of the processing units 22 of the vision system 20.

When the M input images are the actual images 101, the method of image classes definition of FIG. 3 is carried out online on the vision system 20 itself during regular operation thereof. In this case, part of the processing units 22 of the vision system 20 will be used to carry out the method of image classes definition and part of the processing units 22 to implement the method of image multiprocessing according to FIG. 1, the two methods being performed in parallel to each other. The method of image classes definition of FIG. 3 is preferably continuously (or periodically, according to a predefined time period) executed online to continuously (or periodically) update the set of Q classes, by using subsequent, different groups of M input actual images 101. In order to enable the vision system 20 to classify at block 102 the first incoming actual images 101, it is possible to pre-load a predefined set of Q classes with associated splitting patterns to be used for said first incoming images, waiting to receive a first set of Q classes as a result of the method of image classes definition of FIG. 3; or, in alternative, it is possible to postpone the start of the execution of the multiprocessing method of FIG. 1 to when a first set of Q classes is defined by the method of image classes definition of FIG. 3.

If the image classes definition is performed first offline and then continued online, a predefined set of classes (defined offline by using M input training images 103) can then be suitably continuously modified and/or supplemented online (by using subsequent groups of M input actual images 101), for example by adding new classes that were not foreseeable at the time of the previously occurred off-line image classes definition.

In any case, at block 201 the image splitting operation 201 is carried out onto each of the M input images 101 or 103 and it results in each image being suitably split into P image portions (as schematically shown at block 202 of FIG. 3), based on the execution time of a predefined image processing algorithm (the same of block 106 of FIG. 1). P represents the number of processing units 22 of the vision system 20 that are intended to be used at block 106 for image multi-processing.

After executing the image splitting operation onto all of the M input images 101 or 103, the step of clustering 203 comprises, for all the M input images, the identification, in an image space, of the positions of each split image portion and any split further image portion and the definition of clusters (as schematically shown at block 204 of FIG. 3) based on said identified positions.

Then, the step of classification 205 comprises the definition of a set of Q image classes (as schematically shown at block 206 of FIG. 3) based on the clusters defined in step 203, wherein each class is univocally associated with an optimized splitting pattern representing in the image space a plurality of regions to be allocated to a corresponding plurality of processing units 22 of the vision system 20 for image multiprocessing according to said predefined image processing algorithm.

Blocks 201, 203 and 205 will be described more in detail below with reference to FIGS. 4-6.

Figure 4:
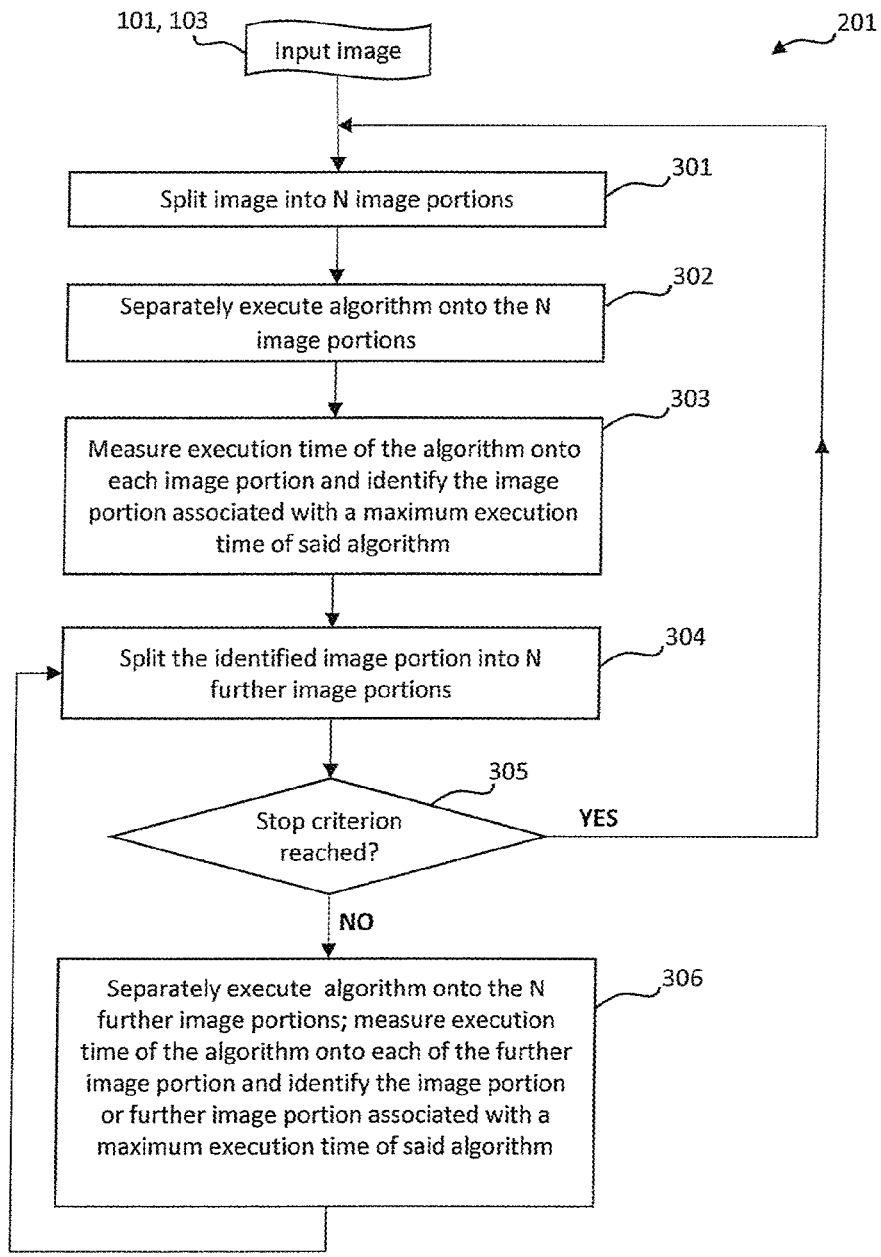
FIG. 4 is a block diagram of an image splitting operation of the method of image classes definition of FIG. 3.

With reference to FIG. 4, for each input image 101, 103, the image splitting operation 201 comprises the following steps.

At block 301 the image is split into N portions, with N≥1.

At block 302, the predefined image processing algorithm (the same of block 106 of FIG. 1) is separately executed onto each of the N image portions.

Block 302 may be performed, for example, by a corresponding plurality of N processing units working in parallel simultaneously, or by a single (or lower number of) processing unit(s) processing all the image portions in sequence, one after the other.

When the method of image classes definition is carried out into the vision system 20 itself, block 302 may be performed by one or more (e.g. N) processing units 22 of the vision system 20. When, on the other side, the method of image classes definition is carried out into an external device, such as for example a dedicated external server, block 302 may be performed by one or more (e.g. N) processing units of such external device.

At block 303, an execution time of the predefined image processing algorithm onto each image portion is measured, and the resulting measured execution times for all the N image portions are compared with each other. Based on this comparison, the image portion associated with a maximum execution time of said algorithm is identified.

As already noted above, in case a plurality of processing units is used at block 302, said processing units should all be symmetric, in order to guarantee the reliability and comparability of the execution times measured at block 303 for the various processing units.

At block 304 the portion identified at block 303 as the portion associated with the maximum execution time, hereinafter indicated as "identified image portion", is split into N further image portions.

At block 305 a check whether a stop criterion is met or not is carried out.

If the outcome of the check of block 305 is positive and therefore the stop criterion is met, the image splitting operation returns to block 301 so as to repeat the image splitting operation onto another one of the M input images till the image splitting operation has been performed onto all the M input images.

If, on the other hand, the outcome of the check of block 305 is negative and therefore the stop criterion is not met, at block 306:
- the predefined image processing algorithm is executed onto each of the N further image portions into which the identified image portion had been divided at block 304;
- the execution time of the predefined image processing algorithm onto each of the N further image portions is measured,
- measured execution times for said N further image portions are compared with each other and also with the execution times previously calculated at block 303 for the other N image portions (the ones not-split at block 304),
- based on this comparison, the image portion or further image portion associated with a maximum execution time of the algorithm is identified, and the image splitting operation returns to block 304.

Preferably, at blocks 301 and 304 the splitting is performed by splitting into N image portions or N further image portions which are equal to each other.

Preferably, the image portions and further image portions have a same aspect ratio of the starting image (for example they all have a square or rectangular shape). Preferably, the number N is a power of two, higher than or equal to $2^1$, for example N=4.

It is noted that even if in the embodiment of FIG. 3 a fixed, same number (N) of split image portions and further image portions at blocks 301 and 304 is considered, the present disclosure may also apply to the case wherein the number of image portions at block 301 is different from the number of further image portions at block 304 and/or to the case wherein the number of further image portions at block 304 may change at each iteration of the same block 304.

In an embodiment (not shown), the stop criterion is met at block 305 when a maximum number Rmax of iterations of block 304 is reached.

To implement this embodiment, a variable R accounting for the number of iterations can be initially set to zero (R=0) at the first splitting step performed at block 301. Then, R may be set to R=R+1 each time, between blocks 304 and 305, before executing block 305. R can take up integer values greater than or equal to 0.

Once fixed the number N (number of split portions at blocks 301 and 304) and the number P of processing units 22 of the vision system 20 that are intended to be used at block 106 for image multiprocessing, Rmax may be obtained by the following formula, so as to guarantee that each image is split into P portions (as exemplarily shown in FIG. 3, block 202):

$$R\max=(P-N)/(N-1).$$

According to an alternative embodiment, the stop criterion may be met at block 305 when the last measured maximum execution time is lower than a predefined threshold value.

According to a mixed embodiment, at block 305 the stop criterion may be considered to be met when a first one between the above criteria (last measured maximum execution time lower than a predefined threshold value or R=Rmax) is reached.

Figure 5:
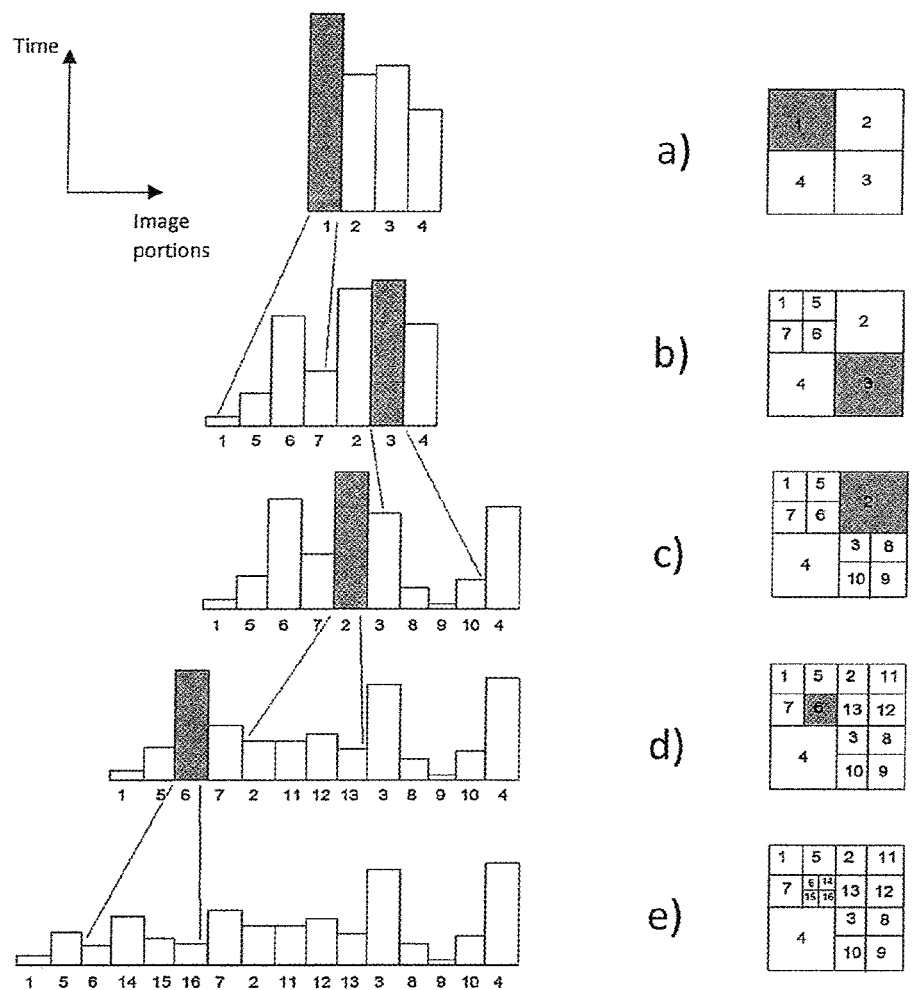
FIG. 5 exemplarily illustrates the splitting operation of FIG. 4.

The splitting operation 201 is further explained by the example of FIG. 5, wherein N=4, P=16 and Rmax=4. The situation of P=16 corresponds to the practical example given above with reference to FIG. 2, wherein a vision system 20 equipped with twenty processing units 22 has four processing units busy for general operation of the vision system 20, and sixteen processing units 22 available for image multiprocessing.

As schematically shown in FIG. 5a, the image is first split (at block 301) in N (N=4) image portions 1, 2, 3, 4. The grey column no. 1 represents the first split portion 1, that resulted to have the maximum execution time at block 303.

As schematically shown in FIG. 5b, at a first iteration of block 304 the first portion 1 is split into N (N=4) further image portions 1, 5, 6, 7. The grey column no. 3 represents the third split portion 3, that resulted to have the maximum execution time at a first iteration of block 306.

As schematically shown in FIG. 5c, at a second iteration of block 304 the third portion 3 is split into N (N=4) further image portions 3, 8, 10, 9. The grey column no. 2 represents the second split portion 2, that resulted to have the maximum execution time at a second iteration of block 306.

As schematically shown in FIG. 5d, at a third iteration of block 304 the second portion 2 is split into N (N=4) further image portions 2, 11, 13, 12. The grey column no. 6 represents the sixth split portion 6, that resulted to have the maximum execution time at a third iteration of block 306.

As schematically shown in FIG. 5e, at a fourth iteration of block 304 the sixth portion 6 is split into N (N=4) further image portions 6, 14, 15, 16.

At this point, as R=Rmax=4, the stop criterion is met at block 305.

In FIG. 5 a top-down, clockwise split portions numbering rule has been exemplarily used.

With reference to the splitting operation, it is noted that union of all the final portions into which each of the M input images is split at the end of the splitting operation of FIGS. 4-5 shall always result into the whole input image.

The clustering step 203 and the classifications step 205 of FIG. 3 are further explained with reference to the example of FIG. 6.

The clustering step 203 is preferably performed on all M input images by marking in an image space 26 the position of each split image portion and any split further image portion as resulted, for each image, from each iteration of the splitting step performed at block 304 (the position of the image portion split at block 301 being the same for all images so that it is not essential to also store it).

The image space 26 may be defined by a plane having the same size and same coordinate system of the M digital input images (all having same size and same coordinate system, as resulting from the image digital sensor used to take the M input images). The coordinate system is preferably a bi-dimensional Cartesian coordinate system.

For example, a proper number a (e.g. α=1) of suitable markers is used to mark each position in the image space 26.

Figure 6:
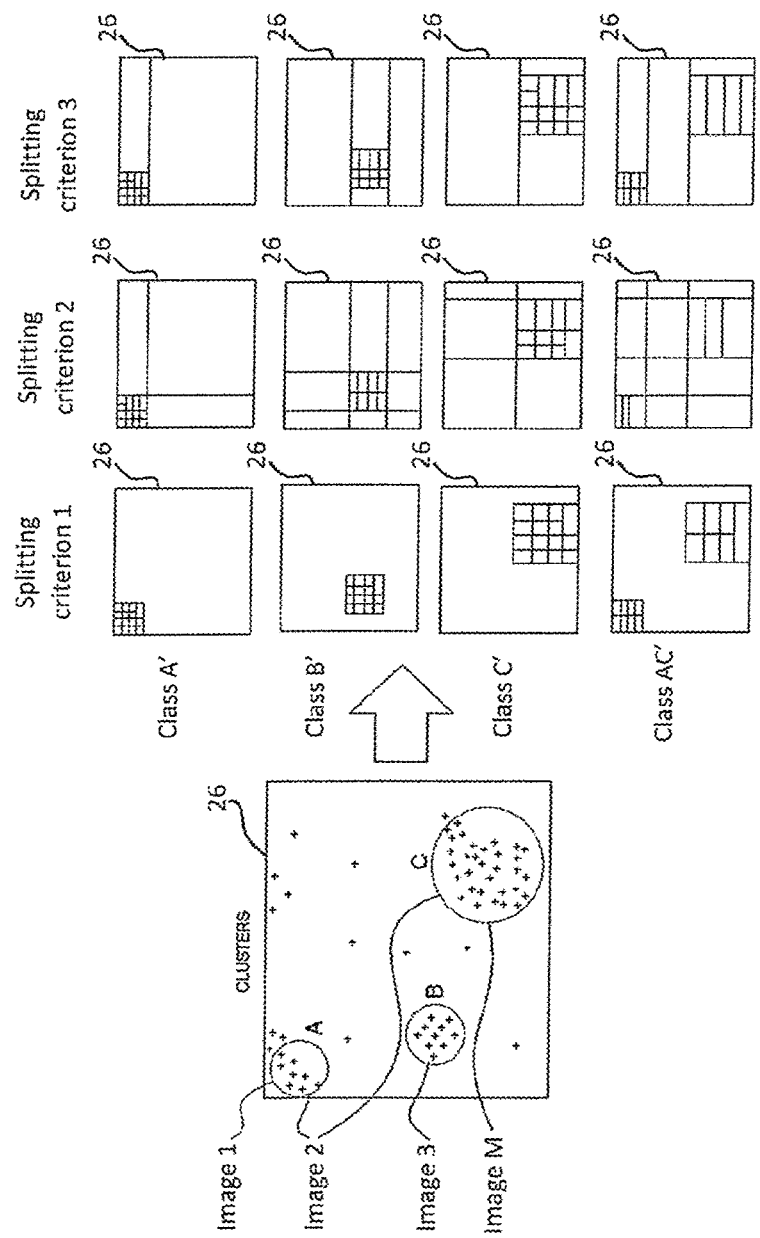
FIG. 6 exemplarily illustrates a clustering step and a classification step of the method of image classes definition of FIG. 3.

In the example of FIG. 6 a "+" symbol is used as marker (with α=1).

The markers or, in any case, the positions related to each image are suitably stored in a proper memory location at the execution of each splitting steps at blocks 301 and 304.

For example, a central position of each split image portion and any split further image portion can be marked by using the suitable marker.

For instance, with reference to an exemplarily image, split according to the example of FIG. 5, the central positions of the first split portion 1, the third split portion 3, the second split portion 2 and the sixth portion 6 will be marked in the image space 26, optionally together with the central position of the whole image.

Once plotted the markers in the image space 26 for all M input images, clusters of said markers are suitably defined, according to clustering techniques known in the art.

The task of the clustering algorithm is that of grouping the images in such a way that images in a same group (i.e. cluster) are "more similar" to each other than those in other groups (clusters), where similarity can be defined by distances among the cluster markers, density of the markers in the image space 26 or particular statistical distributions.

For example, any of the following algorithm can be used: K-means algorithm, Agglomerative Hierarchical Clustering (AHC) algorithm, and Density-based spatial clustering of applications with noise (DBSCAN) algorithm.

The input data set for the clustering algorithm may comprise, for example, the following parameters:
- number of images (M)
- overall number of markers obtained at the end of the splitting operation 201 performed for all the M images (note that a different number of splittings may be performed for different images, depending on the stop criterion used at block 305)
- overall number of 2D coordinates (e.g. X, Y coordinates in the image space 26) for the positions marked for all the M images (e.g. equal to 2*(overall number of markers)).

In the example of FIG. 6, three clusters are exemplarily obtained: clusters A, B and C, with other markers "+" being considered meaningless outliers. In the example, while image 1 belongs to cluster A only, image 3 to cluster B only and image M to cluster C only, image 2 belongs to both clusters A and C.

Once obtained the clusters, classification step 205 is performed in order to define a limited set of Q classes.

Some images (as image 2 in the example) will belong to more than one cluster and a single cluster could be connected with many images.

Taking into account a correlation of the M input images with the defined clusters, every class may be defined starting from one or more clusters.

In particular, a class is preferably obtained for each cluster. Moreover, classes may also be obtained from the aggregation of more clusters.

In the example of FIG. 6, three classes A', B', C' may be determined, one for each cluster A, B, C and, taking into account the correlation of image 2 with clusters A, C, another class AC' may also be determined.

Of course, in case of images belonging to all three clusters A, B, C, then an additional class ABC' may also be provided.

It is noted that each class may be related to multiple images while each image may belong to only one class. Moreover, each class may represent the union of more clusters so that an image may belong to more clusters.

In the classification step 205, once the Q classes are defined, an optimized splitting pattern (that correspond to an optimized processing unit allocation pattern) is associated with each class, taking into account the actual available number P of processing units 22 in the vision system 20 (e.g. P=16).

In particular, each splitting pattern represents in the image space 26 a plurality of regions to be allocated to the actual available number P of processing units 22 in the vision system 20, so as to enable image multiprocessing according to blocks 102-107 of FIG. 1.

As shown in FIG. 2, the optimized splitting patterns so obtained are indeed saved in memory 23 of the vision system 20 in association with the corresponding classes so as to be retrieved at block 105 of FIG. 1, depending on the class each time identified at block 102.

In general, the plurality of regions of each splitting pattern is defined in the image space 26 by splitting the image space 26 more densely in correspondence of the position of the cluster(s) of the corresponding class, and by splitting more sparsely the rest of the image space 26.

It is noted that union of all the plurality of regions of each splitting pattern shall result into the whole image space 26.

However, a certain overlapping degree can be introduced between adjacent regions in order to allow better results.

Indeed, partial outputs obtained from overlapping regions will be correlated, and this correlation can be advantageously exploited when partial outputs are combined to obtain the overall single output for the whole image (block 107 of FIG. 1). For example, an incomplete feature of a region can be understood to be the same feature of another region.

For example, according to a first splitting criterion schematically represented in FIG. 6, in the image space 26 a square can be considered, which is centred as the cluster (e.g. cluster A, B or C) under consideration and having side of the same size of the diameter or principal component dimension of the cluster A, B, or C under consideration, depending on the particular shape of the cluster. Then, inside said square, starting from the centre and moving a quarter of the side to the right, left, top and bottom of the square, horizontal and vertical lines are plotted (in case of multiple clusters, this is done simultaneously for all clusters), till P-1 split portions are obtained. The Pth portion will cover the rest of the image space 26.

According to a second splitting criterion schematically represented in FIG. 6, in the image space 26 a square can be considered, which is centred as the cluster (e.g. cluster A, B or C) under consideration and having side of the same size of the diameter or principal component dimension of the cluster A, B, or C under consideration. Then, the sides of the square are extended all over the input image; and inside said square, starting from the centre and moving a quarter of the side to the right, left, top and bottom of the square, horizontal and vertical lines are plotted (in case of multiple clusters, this is done simultaneously for all clusters), till P split portions are obtained as a whole.

According to a third splitting criterion schematically represented in FIG. 6, the second criterion is applied with the difference that the vertical lines outside the square(s) are removed.

Once the set of Q classes is defined and each class is suitably associated with a corresponding optimized splitting pattern as described above, the classification step 205 further comprises a step of training a classifier to enable it to identify (at block 102 of FIG. 1), for any image to be processed by the vision system 20, a class to be associated with the image to be processed, among the predefined set of Q classes.

The classifier will be trained by considering the M input images for which the classes are already known and by setting the parameters of the classifier so that it is able to correctly classify said images and in order to guarantee, in case of a generic input image, a high classification accuracy (e.g. able to correctly classify at least 90%, or preferably at least 95%, of generic input images).

The classifier may be built by using a suitable mathematical model, according to techniques known in the art.

For example, an artificial neural network can be adopted.

For example, a feature-based approach can be used in the neural network, considering that different image processing algorithms will perform differently, with regard of the execution time, when applied to images containing different features. In fact, in an earlier calibration of the image classes definition method on a specific algorithm, it is possible to derive information linking the execution time to the specific type of features contained in the images (e.g., edges with different orientation and contrast, or segments of different shapes).

So, by first extracting relevant features from the image as a pre-processing step, it is possible to use them within the neural network so as to obtain a more quick and robust classification.

The Applicant notes that a multi-layer feedforward neural network could, on the one side, work at sufficiently high speed at run-time phase and, on the other side, be simpler with respect to a deep artificial neural network (such as convolutional neural network architectures).

It is noted that in order to limit a "combinatory explosion" for the total number Q of classes following the clustering step 203, threshold-based criteria may be used to limit the number Q of classes defined in classification step 205.

As an example, a new class should be created from the union of multiple clusters only if the number of images shared from such multiple clusters exceeds a defined value (e.g. 5 or 10% of the M input images involved in the image classes definition method).

Another point may be that, during the training phase of the classifier, new classes could be carefully introduced if the classification error (in regard of a defined metric) is greater than an acceptable value, or deleted if the classification error is very low (this is also to avoid overfitting).

As it will be clear from the above description, peculiarity of the present disclosure is the adoption—by means of the method of image classes definition—of a predictive machine learning approach, applicable to any image analysis algorithm, that manages multiprocessing resource allocation. The image classes, with the respective optimized splitting pattern, used by the image multiprocessing method are identified on the basis of algorithm execution times rather than data content. The multiprocessing method is thus able to optimally split every image to be processed by the vision system in a number of portions, to be separately elaborated in parallel by multiple processing units, in such a way that enables to avoid over- or under-utilization of the processing units of the vision system that would otherwise be present in case of an image splitting performed with a fixed predefined number of split portions having a predefined size and a predefined position.

Accordingly, the present disclosure advantageously enables to automatically optimize exploitation of the parallel processing power of a vision system even when large images are involved in typical identification or machine vision algorithms.

There are no limitations in terms of the specific image processing algorithm; any possible algorithm of image analysis can be involved, including a stack of algorithms, each running one after the other.

The present disclosure is well suited for on-line training too, which means that the performance of the multiprocessing method can continuously and automatically improve in the field without any human supervision or intervention. The proposed novel approach can be considered an original soft-AI (Artificial Intelligence) approach.

We claim:

1. A method for defining image classes definition for image multiprocessing according to a predefined image processing algorithm of a vision system, said method comprising:
    an image splitting operation for each image of an integer number of input images, with the integer number being higher than 1, the image splitting operation including:
        a) splitting the image into image portions;
        b) executing the predefined image processing algorithm onto each image portion with at least one processing unit;
        c) measuring an execution time of the predefined image processing algorithm onto each of the image portions and identifying the image portion among the image portions which is associated with a maximum execution time of the predefined image processing algorithm;
        d) splitting the identified image portion into further image portions;
        e) checking if a stop criterion is met:
            e1) if the stop criterion is met, iterating steps a) to e) onto another one of the input images until the image splitting operation has been performed onto all the input images;
            e2) if the stop criterion is not met,
            executing the predefined image processing algorithm onto each of the further image portions;
            measuring an execution time of the predefined image processing algorithm on each of the further image portions and identifying, among the image portions and the further image portions, the image portion or further image portion which is associated with a maximum execution time of the predefined image processing algorithm; and
            iterating steps d) to e) on the so identified image portion or further image portion;

wherein after executing steps a) to e) on all of the input images, the method further including:

f) identifying in an image space, for all the input images, the positions of each split image portion and any split further image portion and defining clusters based on the identified positions;

g) defining a set of image classes based on the clusters, with an integer number of image classes being higher than 1, each class being univocally associated with a splitting pattern representing in the image space a plurality of regions to be allocated to a corresponding plurality of processing units of the vision system for image multiprocessing with the predefined image processing algorithm.

2. The method according to claim 1, wherein in step g) a class is defined for each cluster.

3. The method according to claim 1, wherein in step g) the set of image classes is defined taking into account a correlation of the input images with the defined clusters.

4. The method according to claim 1, wherein in step g) at least one of the classes is defined based on an aggregation of more clusters.

5. The method according to claim 4, wherein the aggregation of clusters is taken into account only if a percentage of the input images is correlated with it.

6. The method according to claim 1, wherein in step g) the plurality of regions of the splitting pattern are defined in the image space by splitting the image space more densely in correspondence of the position of the cluster(s) on the basis of which the corresponding class is defined, and by splitting sparsely the rest of the image space.

7. The method according to claim 1, wherein in step f), the positions of each split image portion and any split further image portion are marked in the image space by using suitable markers.

8. The method according to claim 7, wherein the clusters are clusters of the suitable markers identified in the image space.

9. The method according to claim 1, wherein the stop criterion checks whether a maximum number Rmax of iterations of step d) is reached.

10. The method according to claim 1, wherein the stop criterion checks whether the last measured maximum execution time is lower than a predefined threshold value.

11. The method according to claim 1, wherein the splitting of step a) is performed so that the image portions are equal to each other.

12. The method according to claim 1, wherein the splitting of step d) is performed so that the further image portions are equal to each other.

13. The method according to claim 1, wherein at least one of the image portions obtained in step a) or the further image portions obtained in step d) have a same aspect ratio of the starting image.

14. The method according to claim 1, wherein at each iteration of step d), a same integer number of the further image portions is obtained, with integer number higher than 1.

15. The method according to claim 1, wherein the image portions obtained in step a) are in a same integer number as the further image portions obtained in step d), with integer number higher than 1.

16. The method according to claim 1, wherein at least one of the image portions or the further image portions are in a number which is a power of two.

17. The method according to claim 1, wherein the input images are training images.

18. A vision system for image multiprocessing according to a predefined image processing algorithm, comprising:

a memory for storing a set of image classes and corresponding splitting patterns univocally associated with the classes, with the number integer images being higher than 1, as defined through a method of image classes definition according to claim 1, executed with the predefined image processing algorithm; and processing units adapted to:

receiving an image to be processed;

associating with the image a class among a predefined set of image classes, the class having a splitting pattern univocally associated therewith;

splitting the image according to the splitting pattern; and executing the predefined image processing algorithm separately onto all portions resulting from the splitting by a corresponding plurality of processing units of the vision system, wherein the predefined set of image classes and the splitting patterns univocally associated therewith are defined through a method of defining image classes, executed with the predefined image processing algorithm.

19. A method for image multiprocessing in a vision system according to a predefined image processing algorithm, comprising:

receiving an image to be processed;

associating with the image a class among a predefined set of image classes, the class having a splitting pattern univocally associated therewith;

splitting the image according to the splitting pattern, wherein splitting further includes:

a) splitting the image into image portions;

b) executing the predefined image processing algorithm onto each image portion with at least one processing unit;

c) measuring an execution time of the predefined image processing algorithm onto each of the image portions and identifying the image portion among the image portions which is associated with a maximum execution time of the predefined image processing algorithm;

d) splitting the identified image portion into further image portions; and executing the predefined image processing algorithm separately onto all portions resulting from the splitting by a corresponding plurality of processing units of the vision system, wherein the predefined set of image classes and the splitting patterns univocally associated therewith are defined through a method of defining image classes executed with the predefined image processing algorithm.

20. The method according to claim 19, wherein the method of image classes definition is executed:

wholly offline with training images; or partially offline with training images and partially online with the same images to be processed by the vision system; or wholly online with the same images to be processed by the vision system.

* * * * *